(No Model.)

J. McKENNA.
TROLLEY WHEEL.

No. 559,461. Patented May 5, 1896.

WITNESSES:
Fred A. Phelps Jr
H. G. Kantner

INVENTOR
John McKenna
BY
Ward Raymond
ATTORNEY.

ANDREW B.GRAHAM. PHOTO-LITHO. WASHINGTON. D.C.

UNITED STATES PATENT OFFICE.

JOHN McKENNA, OF JOHNSTOWN, PENNSYLVANIA.

TROLLEY-WHEEL.

SPECIFICATION forming part of Letters Patent No. 559,461, dated May 5, 1896.

Application filed March 2, 1896. Serial No. 581,605. (No model.)

*To all whom it may concern:*

Be it known that I, JOHN McKENNA, of Johnstown, county of Cambria, State of Pennsylvania, have invented certain new and useful Improvements in Trolley-Wheels, of which the following specification is a true and exact description, due reference being had to the accompanying drawings.

My invention relates to certain improvements in trolley-wheels, and has for its object to provide a wheel in which those parts subjected to wear are readily replaceable and are so constructed as to reduce the amount of material scrapped, while at the same time having a wheel of greater strength and durability than those heretofore used.

In sectional trolley-wheels as heretofore constructed the usual practice has been to form a central hub which bore against the wire and to place on each side of this a flange or disk, thus forming a deep groove for the wire. As those parts of the wheel which come in contact with the wire should be of copper or similar metal and not iron or steel, it has been customary not only to form the hub of brass or similar metal, but to form the flanges of this as well. This metal being comparatively soft does not satisfactorily withstand the wear and tear of service, the jar and pounding incurred at switches and crossings soon knocking the flanges out of shape. To make them sufficiently heavy would greatly increase the weight of the wheel and render the cost prohibitive.

By my invention I am enabled to provide a wheel having a copper or similar metal at all points touched by the wire and at the same time light and strong.

In general a wheel embodying my invention contains a central hub, which is preferably bushed with some suitable antifriction-bushing, a flange of copper or similar metal on each side of the hub, another pair of supporting-flanges, one outside each of the inner flanges, and means, as bolts, nuts, or rivets, for securing the whole together.

Figure 2:
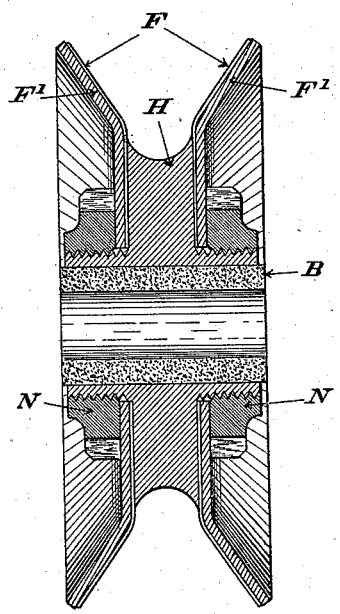
Figure 1:
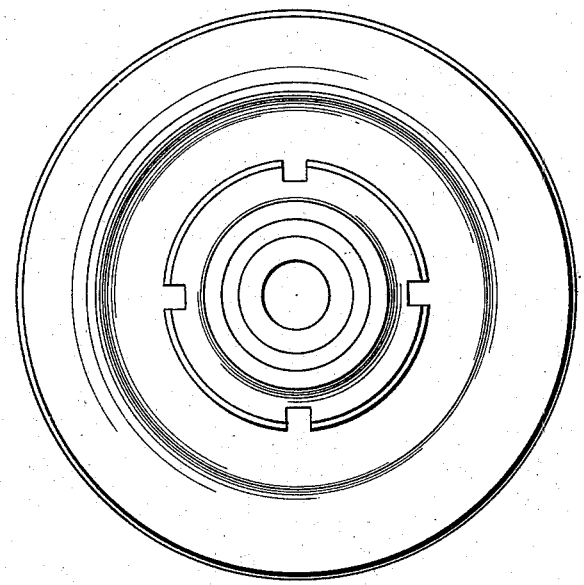
Figure 5:
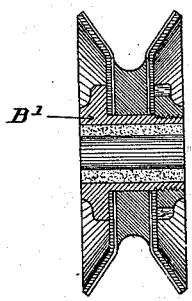
Figure 3:
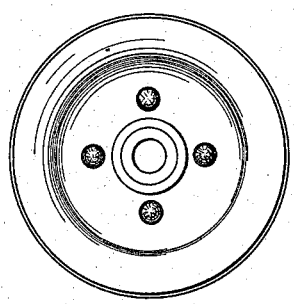
Figure 4:
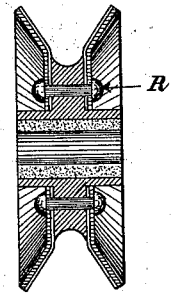

Referring to the drawings, Figure 1 represents a side view of a wheel embodying my invention. Fig. 2 is a section through the center of same. Fig. 3 is a side view of a wheel slightly different from that shown in Fig. 1. Fig. 4 is a section through Fig. 3. Fig. 5 is a section showing still another modification.

Referring to Fig. 2, H is the central hub, provided with the antifriction-bushing B. On each side of the hub is the thin flange F, properly dished, so as to combine and form the proper-shaped groove. This flange I preferably form of hardened sheet-copper or other suitable metal, as Tobin bronze, and I stamp it from thin sheet metal. This of itself would be far too slight to stand, so I reinforce it with the outer flange F'. This flange I preferably form of sheet-steel and of the same shape as the other, so that they fit snugly together. This flange is of the full size of the inner one and therefore supports it to its very edge, while at the same time receiving no wear. As weight for weight steel is much stronger than copper I am enabled to materially reduce the weight of my wheel, and by the substitution of steel for the more expensive metals a very considerable saving in cost is effected. To secure the several parts together, any of the well-known means may be employed. In Fig. 2 the nut N is shown threaded on the hub on each side. In Figs. 3 and 4 they are secured by rivets R, and in Fig. 5 there is an intermediate bushing B', having a fixed collar on one end and a loose nut on the other.

Having thus described my invention, what I claim, and desire to protect by Letters Patent, is—

1. In a trolley-wheel, a separable inner wearing-flange on each side of a central hub and an outer supporting-flange fitting against the inner flange and adapted to support the outer edge of the same.

2. In a trolley-wheel, a separable composite flange composed of a face of metal adapted to make contact with the line-wire and a backing of separate metal adapted to support the first-mentioned metal.

3. In a trolley-wheel, a separable, composite flange composed of a disk of copper or similar metal and a supporting-disk of substantially the same diameter.

4. In a trolley-wheel, in combination, a central hub, a separable flange on each side thereof, said flange being composed of an inner wearing-piece and an outer supporting-piece, and means for securing the several parts together.

In testimony whereof I have affixed my signature in presence of two witnesses.

JOHN McKENNA.

Witnesses:
H. W. SMITH,
JOHN H. KENNEDY.